Aug. 21, 1962 M. L. BENSON ETAL 3,050,588

REGISTRATION CONTROL CIRCUIT

Filed Jan. 5, 1960 3 Sheets-Sheet 1

INVENTORS M. L. BENSON
C. BREEN
BY [signature]
ATTORNEY

REGISTRATION CONTROL CIRCUIT

Filed Jan. 5, 1960 3 Sheets-Sheet 2

INVENTORS M. L. BENSON
C. BREEN
BY
[signature] Turner
ATTORNEY

Aug. 21, 1962 M. L. BENSON ETAL 3,050,588

REGISTRATION CONTROL CIRCUIT

Filed Jan. 5, 1960 3 Sheets-Sheet 3

INVENTORS M. L. BENSON
C. BREEN
BY [signature]
ATTORNEY

United States Patent Office 3,050,588

Patented Aug. 21, 1962

3,050,588
REGISTRATION CONTROL CIRCUIT

Milton L. Benson, Chatham, N.J., and Charles Breen, Mineola, N.Y., assignors to Bell Telephone Laboratories, Incorporated, New York, N.Y., a corporation of New York Filed Jan. 5, 1960, Ser. No. 645
19 Claims. (Cl. 179—18)

This invention relates to telephone systems and has as its general object the improvement of the means of registration and call completion in such systems.

Common control techniques are widely employed in the telephone art. As an incident to the completion of a call in a crossbar telephone system, for example, a common marker will respond to a request for service from a calling subscriber by connecting the calling line to a common register circuit. The calling subscriber will then, upon hearing dial tone, transmit the code designation (telephone number) of the called line to the register. When the register has recorded the called line designation, it will so notify the marker, and the marker will proceed to establish the desired connection in accordance with the registered line designation.

Manual subscriber dialing is the traditional and still most common method of transmitting a code designation to a register; it is, however, somewhat inefficient. The dialing activity itself demands a substantial amount of subscriber time, effort, and dexterity. In addition, dialing time is the factor which prevents the most efficient use of common register equipment, and which occupies the greatest proportion of call completion time (aside from called party answering).

Numerous arrangements have been devised with the object of mitigating or eliminating one or more of the disadvantages of digit-by-digit manual subscriber dialing. One type of arrangement is that which employs a preset mechanical or electromechanical dial pulsing device situated at the subscriber's substation. Such a device may be given a memory of frequently called numbers, or may be set by the subscriber prior to placing each particular call, or may provide for some combination of the foregoing. Upon initiating a request for service to the common equipment and receiving dial tone, the subscriber may then operate a start key, causing the mechanical device to transmit automatically a series of dial pulses, appropriately spaced interdigitally, to an attached register. While such a device offers advantages from the standpoints of increased dialing efficiency, reduced subscriber participation in pulse transmission, and compatibility with systems having subscribers who are restricted to manual dialing, it is of somewhat limited utility due to the expense of the device and the substantial pulse transmission time required thereby. Another type of arrangement well known to those skilled in the art, is that utilizing multifrequency key pulsing. However, the expense of the equipment required, and the general incompatibility of dial pulse and multifrequency pulse systems, have caused this type of arrangement to have been of rather limited application. In addition, the user of a multifrequency pulsing arrangement is usually required to perform a plurality of key operations in order to transmit the plurality of digits comprising a called line number. Finally, a type of arrangement may be employed wherein each of a plurality of groups of conductors is conditioned by the telephone user according to a different digit of a called line designation preparatory to transmission, the plurality of groups then being connected in parallel to a register simultaneously at an appropriate time. While such arrangements permit extremely rapid transmission, the required amount of substation-to-register equipment is excessive.

An object of the present invention is to provide improved means for controlling the registration of a plurality of data.

Another object of the invention is to provide means responsive to a single subscriber operation and which is effective to serially record a plurality of digits in a corresponding plurality of sections of a register.

Still another object of the invention is to provide means according to the preceding object and which is compatible with a dial pulse register.

Yet another object of the invention is to provide registration control means which is effective in response to a single subscriber operation to connect sequentially a first and a second group of significantly conditioned conductors to a common group of conductors terminating in a register, and to advance said register in a positive manner in synchronism with the said sequential connection.

A feature of the invention is means whereby a register having a plurality of sections and a single input is positively controlled to advance in synchronism with a plurality of data arriving at its input in timed sequence, and to disconnect its input from the source of data when the last datum has arrived.

Another feature of the invention is a control circuit having a plurality of outputs and connectable by a single channel to a register having a corresponding plurality of sections and an advance means, the said control circuit being operable to sequentially connect said outputs to said channel and to positively control said advance means to advance the register in synchronism with said sequential connection.

Still another feature of the invention is a control circuit in accordance with the preceding feature and which comprises a plurality of slow operate relays operating in tandem, and wherein control over said register is exercised via a control conductor interconnecting said register and said control circuit.

An appreciation of these and other features of the invention can be had upon consideration of the following description, the appended claims, and the drawing in which:

FIG. 1 shows a key pulse circuit and circuits related thereto;

FIGS. 2, 3 and 3*a* show portions of a register and related circuits;

Figures 1, 4, 5:
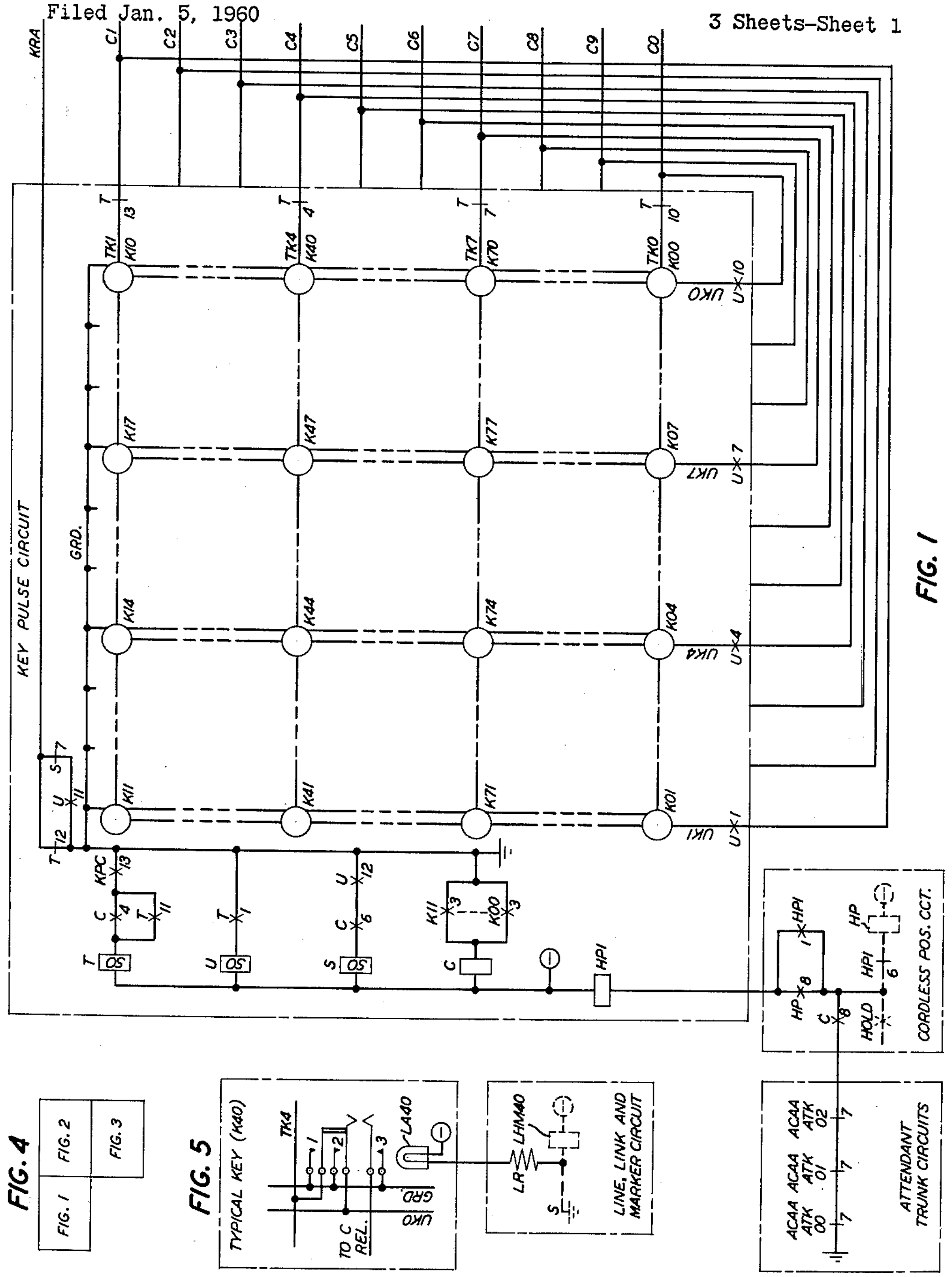
FIG. 4 shows the proper arrangement of the drawing sheets for proper interconnection of the circuitry disclosed therein.
FIG. 5 shows a typical key of the key pulse circuit.

In exemplary embodiment, the present register control arrangement is shown integrated with the registration and other aspects of the telephone switching system disclosed in United States Patent 2,904,637 granted to R. D. Williams, September 15, 1959, which patent is hereby incorporated by reference. Portions of FIGS. 1, 2, 3, 3*a* and 5 have been adapted from the drawing in the Williams patent, supra. In order to distinguish (in the latter figures) what is old in Williams (relays, contacts, conductors, etc.) from what has been added thereto in accordance with the instant invention, the former is shown dotted and the latter is described by solid lines. Designations employed in the Williams drawing to identify elements which are reproduced in the present drawing have been retained.

In the Williams disclosure, the detached contact method of circuit representation is used. Except for part of FIG. 5, this method is used in the present disclosure also. Detached contact circuit representation is by now well established in the art and is discussed at some length in the Williams patent, supra. It may be helpful at this point, however, to make some general remarks anent this form of representation in order to assist the general reader. In detached contact drawings, the motor elements, such as relays, keys, etc., are shown separate from the contacts controlled thereby. This permits electrical circuits to be considered as separate functional units. A relay is represented by a small rectangular box labeled according to the relay designation: e.g., key pulse control relay KPC in the upper central portion of FIG. 3. A make, or normally open, contact is represented by the symbol X labeled according to its own numerical designation and the designation of the relay by which it is operated: e.g., the symbol X to the right of relay KPC in FIG. 3, designated SR and 10, is the number 10 make contact of supervisory relay SR (not shown). A break, or normally closed, contact is represented by a short line segment perpendicular to the conductor on which it occurs and is labeled in the same manner as a make contact is: e.g., the vertical line segment to the right of relay KPC in FIG. 3, designated DC and 4, is the number 4 break contact of dial completion relay DC (shown in FIG. 2). A transfer contact is represented by a closely associated pair of make and break contacts having the same designation and being located in different branches of a node occurring at the juncture of two conductors: e.g., transfer contact 4 of relay KRA shown in solid lines in the central portion of FIG. 3*a*.

In order to assist the reader in understanding how the present register control arrangement may be employed in an existing system, the telephone system disclosed in the Williams patent, supra, will be described briefly.

The system disclosed in the aforementioned Williams patent (hereinafter called the Williams PBX or Williams system) is a common-control crossbar PBX designed to provide for interconnection between station lines, central office trunks, tie trunks, attendant trunks, and various special service arrangements. The PBX switching plan employs common marker and register circuits. The completion of connections within the PBX involves the use of a dial pulse register circuit which registers the dialed designation of the desired PBX extension, and then signals the line, link and marker circuit (hereinafter called the marker), passing thereto the information necessary to complete the desired connection.

The present invention, although not in any wise so limited, is particularly well adapted to use on attendant-originated calls to extensions in the Williams PBX via central office or attendant trunks. The progress of a call incoming to the PBX via a central office trunk is fully described in the Williams patent; the progress of such a call will be described in a general way hereinafter, however, in order to acquaint the reader with the operation of the Williams PBX and to prepare a background for the detailed description of the modifications made thereto in accordance with the present invention.

Figures 3, 3A, 6:
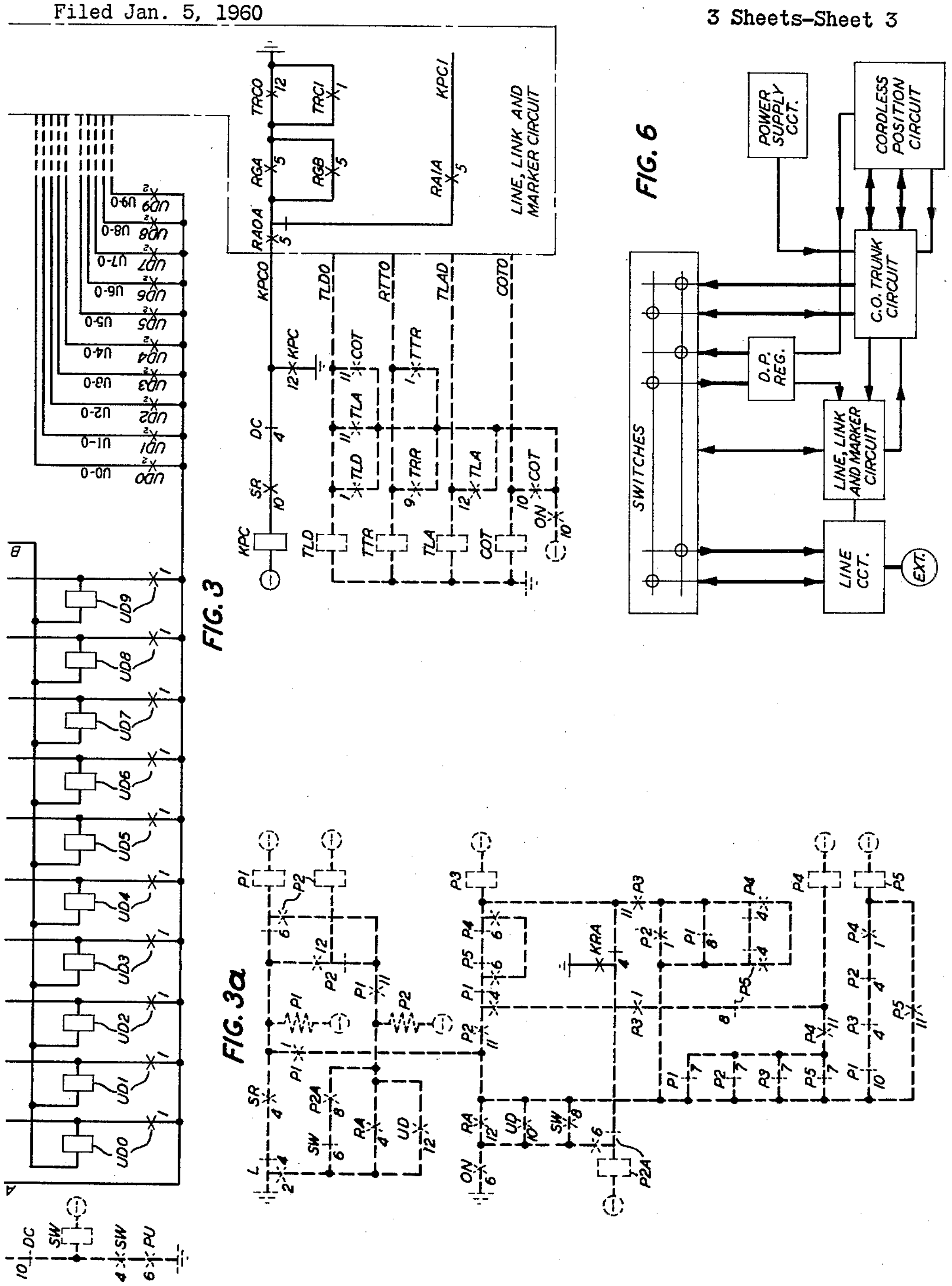
FIG. 6 is a functional block diagram useful in understanding the system's aspects of the exemplary embodiment of the instant invention.

Referring now to FIG. 6, all incoming calls to the PBX from a central office are handled by the PBX attendant. When a central office trunk is seized at the central office (not shown), the attendant is alerted to the incoming call by lamp and audible signals in the cordless position circuit. The attendant will then operate a key associated with the particular central office trunk, putting herself into talking relation with the calling party. Upon ascertaining the code designation of the desired PBX extension, the attendant will operate, momentarily, a hold key in the cordless position circuit. The operation of the hold key (1) causes the trunk to split, (2) causes a holding condition to be placed on the outer end of the trunk (toward the central office), (3) places the attendant in talking relation with the inward end of the trunk (toward the crossbar. switches), and (4) causes the trunk to request service of the marker. When the marker responds to the request for service by the trunk, it connects the trunk to an idle dial pulse register via a horizontal link in the crossbar switches, and notifies the connected register of the class of service to which the calling trunk is entitled. The marker then leaves the connection. The connected dial pulse register returns dial tone to the attendant via the established connection through the PBX switches, the inward end of the central office trunk, and the cordless position circuit. The attendant then proceeds to dial the two-digit code designation of the desired PBX extension. The dialed digits are registered in the dial pulse register. After receiving the last (units) digit, the register signals the marker. The marker, on responding to the latter signal, is apprised by the register of the destination of the incoming call. The marker then completes the necessary connections, and signals the called extension via the line circuit associated therewith. When the called party answers, he will either be in talking relation with the PBX attendant via the PBX switches and the inward end of the central office trunk, or he will be in direct talking relation with the calling party, depending upon whether the attendant has remained in on the connection or has released herself therefrom, permitting the trunk to return to its normal (no longer split) condition.

It will be appreciated that the human operations required in the foregoing sequency of events are by far the most time consuming, and that the machine operations, such as the establishing of connections by the marker, are accomplished very rapidly (in milliseconds). Calls by the attendant to PBX extensions via attendant trunks proceed in an analogous manner, with the principal exception that no hold key operation is necessary, since an attendant trunk will be unoccupied when seized by the attendant for a call into the PBX and will automatically request connection to an idle register when seized. All of the links shown in FIG. 6 and interconnecting the various principal elements of the Williams PBX are old save the one directly interconnecting the dial pulse register and the cordless position circuit; provision of the latter direct link, together with changes made in the register, marker, and cordless position circuits, are the principal modifications made in the Williams PBX pursuant the instant invention.

The changes made in the Williams system comprise the following: A key pulse circuit is added to the Williams cordless position circuit, one key being supplied for each combination of tens and units digit code designations in the system, and each such key being operative under the proper circumstances to positively and automatically condition the register according to the designation associated therewith; the register circuit is modified to be controllable from the added key pulse circuit, but its ability to register ordinary dialed digits is retained; the marker is adapted to notify the register when key pulse class of service calls are being placed, so that when so notified, the register is placed under the control of the added key pulse circuit. Other changes, of a more limited nature, will be discussed when the occasion to consider them arises in the course of the detailed description. It should be noted that the changes referred to do not change the normal functioning of the Williams PBX in any other respects than those to which specific reference has been made.

The Williams PBX may be provided with two registers and two cordless (attendant) position circuits. The present disclosure is confined to teaching the coordination of a single register and a single cordless position circuit in accordance with the instant invention. It will be obvious to those skilled in the art that the circuit modifications here taught are easily adaptable to a multi-register, multi-attendant position system. For example, a single position circuit having access to two registers might have a separate direct link to each register, only the one extending to the seized register being connected on a particular call. Similarly, if two position circuits were to have access to the same direct link, some well-known mutual lockout provision would prevent simultaneous seizure of that link.

In accordance with the changes made pursuant the instant invention, the Williams PBX will function on a central office call (for instance) in the following manner. Referring again to FIG. 6, the attendant, upon answering an incoming central office call (by operating a central office trunk key as before) and determining the code designation of the desired PBX extension, will operate the nonlocking key in the key pulse circuit corresponding to that designation. The first result of operating the aforementioned key will be a simulation by the key pulse circuit of the momentary hold key operation previously required of the attendant. This will cause the trunk to be split, a hold condition to be established, and a request for service to be made by the trunk to the marker, all as previously described. When the marker responds to the request for service by the central office trunk and completes a connection therefrom to the register, it will perform the additional function of notifying the register that the particular call being served is entitled to the key pulse class of service. The register will respond to the class of service notification by completing the direct link between itself and the cordless position circuit, thus placing itself under the control of the key pulse circuit. As soon as the aforementioned direct link is completed, the key pulse circuit, under the control of the still operated key therein, will cause the register to record automatically the code designation of the called extension. This is accomplished by sequentially energizing the direct link from the key pulse circuit in accordance with first the tens and then the units digit of the designation, and by advancing the register in timed synchronism with this sequence of energization. Dialing and interdigital pause delays are thus avoided. After bringing about the registration as aforesaid, the key pulse circuit will cause the register to call in the marker immediately to complete the call; an end-of-dialing delay is thus avoided. The attendant may release the operated key at this time although this is not necessary. After the marker has completed a connection between the central office trunk and the called extension as instructed, the attendant will be apprised of an answer condition by the lighting of the key associated with the called extension. She may then talk to the called party via the inward end of the split central office trunk (the trunk key will still be operated), or she may release the trunk key, permitting the call to proceed.

Thus, the attendant need not operate a hold key, wait for dial tone from the register via the inward end of the central office trunk, dial the digits of the called extension, or listen in on the extended call until the called party answers. In addition, the impediments of pulse counting time, interdigital pause, and end-of-dialing delay are overcome in the register.

It is perhaps well to point out at this juncture that the present mode of call completion is not limited to use by only the attendant, nor is it restricted to use on only central office or attendant trunk calls. This will appear more clearly upon consideration of the detailed description which follows.

*Detailed Description*

To the cordless position circuit of Williams has been added the key pulse circuit shown in FIG. 1. The latter circuit comprises a plurality of keys and a control circuit. In addition, two small boxes in the lower left portion of FIG. 1 show modifications of existing PBX circuitry.

The plurality of keys, labeled K11 through K00, and represented symbolically by circles, are shown disposed in rectangular array in FIG. 1. Only 16 of the possible total of 100 keys are shown. These are the keys associated with both one of the units conductors UK1, UK4, UK7, and UK0 (and one of the tens conductors TK1, TK4, TK7, and TK0. Units and tens conductors other than those named are not shown within the key pulse circuit, nor are the keys associated therewith. Each key corresponds to a code designation. Key K40, for example, represents the code having a tens digit 4 and a units digit 0. Each key, when operated, is effective to energize a units and a tens conductor by impressing ground potential thereon in accordance with the code which that key represents. The source of this ground potential is the common ground bus GRD. Key K40, for example, is operative to ground units conductor UK0 and tens conductor TK4. In addition, any one of the keys K11 through K00 is operable to operate relay C, shown on the left in FIG 1. The make contacts 3 of keys K11 and K00 to the right of relay C illustrate this. The make contacts 3 of the other keys are omitted but are indicated by the dotted line. All of the keys K11 through K00 are illuminable and nonlocking, a particular key being illuminated or not depending upon whether or not the line in the PBX corresponding thereto is busy or idle.

A typical key, key K40, is shown in FIG. 5 in conventional circuit representation. Key K40 is shown to have three make contacts, of which one side of each is associated with the common ground bus GRD. When key K40 is operated, ground potential will be applied to tens conductor TK4, units conductor UK0, and the winding of relay C, via key K40 make contacts 1, 2, and 3, respectively. In addition to the contacts aforesaid, lamp LA40 is associated with key K40. As indicated, this lamp is illuminable from ground on conductor S via resistor LR in the marker circuit. Conductor S is the energizing conductor for line hold magnet LHM40, is at ground potential whenever line 40 (not shown) is busy and connected to the Williams PBX crossbar switches, and may be found on FIG. 38 of the Williams patent, supra. The purpose of lamp LA40 is two-fold: to let the attendant know if line 40 (not shown) is busy before attempting to complete a connection thereto and to let her know that the party at line 40 (not shown) has answered a call extended by her thereto.

The control portion of the key pulse circuit comprises relays C, S, U, T, and HP1 and circuitry associated therewith. Relay C operates immediately upon the operation of any one of the keys K11 through K00. In essence, this relay provides a group of 3 make contacts, contacts C4, C6, and C8, which are common to all of the keys K11 through K00, and are effectively an addition of 3 contacts to those already provided at each individual key. Relays T, U, and S are all slow-operate relays which operate in tandem in the order named. These relays control the register via conductor KRA and also control the order of signaling from the key pulse circuit. It will be noted that this register control arrangement is relatively straightforward and inexpensive. Relay HP1 operates when central office trunk calls are extended by the attendant into the PBX. The operation of relay HP1 after that of relay HP (shown in the box labeled CORDLESS POS. CCT.) causes the release of the latter, thus simulating momentary operation of the hold key (shown in the box labeled CORDLESS POS. CCT.) by the attendant. Ground potential for the automatic operation of relay HP by relay C is supplied over the back contacts 7 (shown in the box labeled ATTENDANT TRUNK CIRCUITS) of the ACAA relays of attendant trunks O0, O1, and O2, respectively. The purpose of the latter provision is to prevent the operation of hold relay HP on attendant trunk calls, which calls do not require such operation. The portion of the cordless position circuit in which relay HP and the hold key make contact occur may be found in FIG. 39 of the Williams patent, supra. FIG. 9 of Williams shows the relay ACAA of attendant trunk O1; corresponding relays ACAA are provided in attendant trunks O0 and O2.

Units conductors UK1, UK4, UK7, and UK0 are shown extended to common conductors C1, C4, C7 and C0, respectively, via make contacts of relay U. Similarly, tens conductors TK1, TK4, TK7 and TK0 are shown extended to the same common conductors via break contacts of relay T. Common conductors C2, C3, C5, C6, C8 and C9 are shown in branched extension to the right and lower portions of the key pulse circuit, to indicate that numerically correspondent tens and units conductors (not shown) are connected thereto in the manner described above. Conductors C1 through C0 extend to the register circuit of FIG. 2, as does control conductor KRA; these conductors constitute the direct link referred to in FIG. 6. It will be noted that were a second key pulse circuit to be provided, say at another attendant position (not shown), the conductors KRA and C1 through C0 could be connected in parallel to the second key pulse circuit. A mutual lockout arrangement would be effective to prevent concurrent usage and consequent interference between the two key pulse circuits. It will be obvious to those skilled in the art that the use of groups of ten units, tens, and common conductors, one of the ten being energized to represent a particular digit, is not an essential limitation on the instant invention. Groups of five conductors might be used, for example, and two out of the five be energized in accordance with the well-known two-out-of-five code to represent a particular digit. The register of the Williams PBX employs a one-out-of-ten form of registration, however, a corresponding provision in the key pulse circuit and interconnecting link was made.

It is not essential to this invention that all of the keys K11 through K00 be arranged in rectangular array, nor that they all be provided, nor that there be no duplications thereamong, nor that they all have a two-digit designation, nor that they all be located in the same immediate vicinity. From the standpoint of description, it was felt best to show a compact array of consecutively numbered keys, each having a two-digit designation. The permissible degrees of latitude referred to above are inherent in the invention however. In the Williams system, for example, the tens digit 1 is not used; keys K11 through K10, having such a tens digit, need not, therefore, be provided; nor need the tens conductor TK1 associated with keys K11 through K10 be provided. In the Williams system, the tens digits 9 and 0 may be used singly, never having any units digit associated therewith. Only one each of the keys in the groups K91 through K90 and K01 through K00 need therefore be provided; and the keys so provided need have no units digit conductor contacts associated therewith. Furthermore, since the tens digit 0 is used for calls to attendant trunks in the Williams PBX, neither a key having such a tens digit, nor tens conductor TK0, need be provided at all at the attendant's position. It is possible to have more than one key having the same tens and units digits associated therewith; this might be useful if extra keys were desired for some reason. PBX substations might also be provided with keys, duplicate of those provided at the key pulse circuit, corresponding to extension numbers frequently called from those stations. Such obvious applications, extensions, and modifications of the principles of this invention will be apparent to those skilled in the art.

Figure 2:
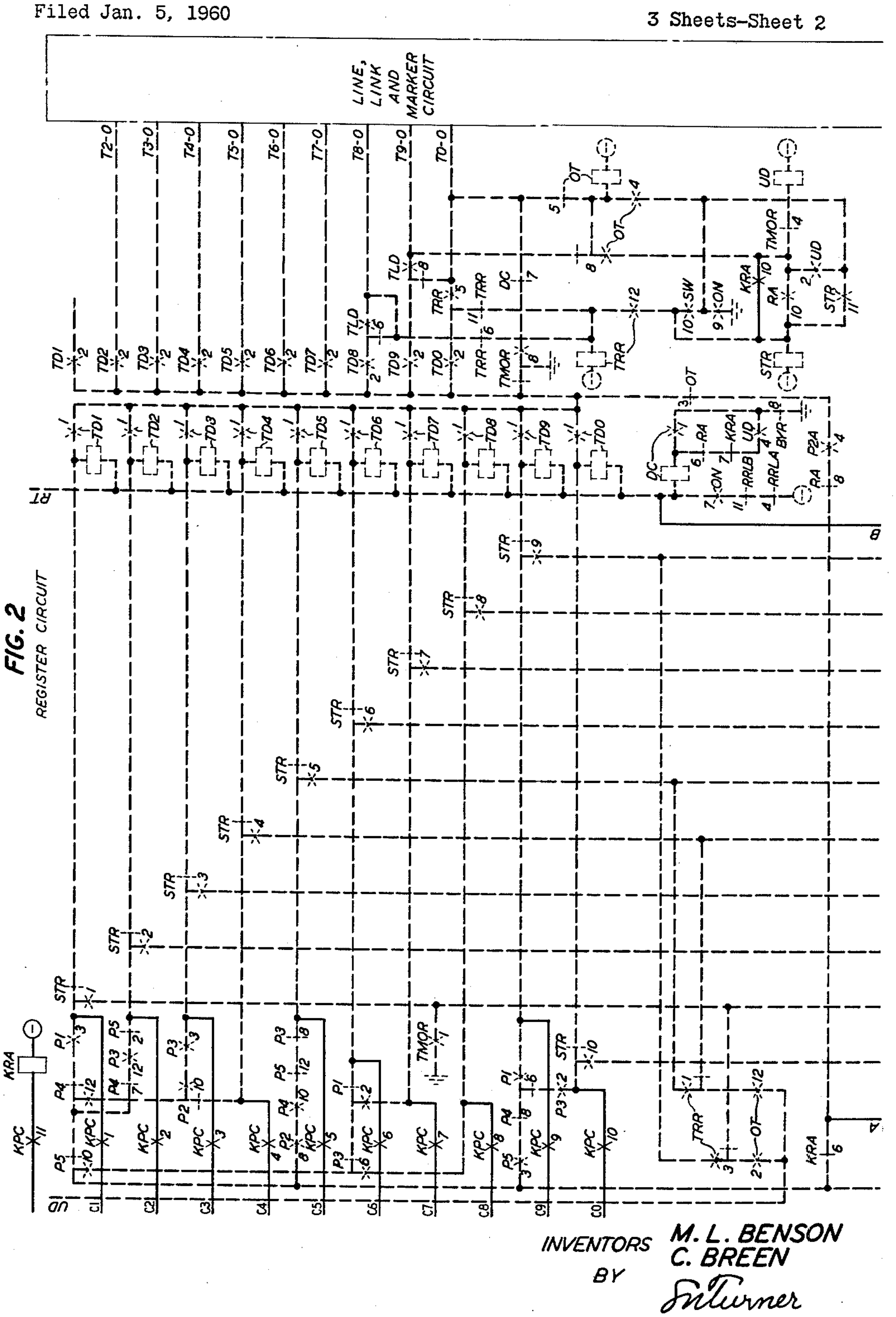

FIGS. 2, 3, and 3*a* show the pertinent parts of dial pulse register 0 of the Williams patent, supra, adapted in accordance with the instant invention. In addition, the Williams marker (line, link, and marker circuit) is shown in block diagram form on the right in FIGS. 2 and 3. The portions of FIGS 2, 3, and 3*a* which are old in Williams are described by dotted lines; the portions of these figures added in accordance with the instant invention are described by solid lines. Not all of the Williams register 0 (FIGS. 14, 18, and 19 of the Williams patent, supra) is reproduced in the present drawing; in particular, certain supervisory, pulse-responsive, and timing aspects thereof have been omitted as unnecessary to the instant disclosure. Where the reproduced portions of the Williams register include contacts of relays omitted as having to do primarily with one of the aforementioned omitted aspects, however, these contacts have been retained in the present drawing, designated as in Williams. The significance of these contacts will be explained when necessary to the coherence of the detailed description. This method of presentation is felt to most effectively teach the exemplary application of the instant invention by permitting direct correlation with the Williams disclosure.

FIG. 2 and the upper portion of FIG. 3 show the principal registration and control circuitry of the register. Before discussing this, however, the dial pulse counting circuit of FIG. 3*a* and the class of service circuit relays in the lower portion of FIG. 3 will be considered.

The pulse counting circuit of FIG. 3*a* comprises the five counter relays P1, P2, P3, P4, and P5, and the auxiliary counter relay P2A. As fully described in the Williams patent, these relays are operative to count and temporarily record, the number of dial pulses comprising the digit or digits of a code designation received by the register via a path not shown in the present disclosure. The counting function is performed under the control of line relay L contacts 2 and 4 in the upper left of FIG. 3*a*. Relay L (FIG. 19 of Williams), not shown here, operates and releases in synchronism with dial pulses incoming to the register. Upon receipt of all the pulses comprising the tens digit of a code designation, the combination of operated and released ones of the relays P1 through P5 permits the particular tens digit to be registered in another part of the register. Upon the subsequent receipt of the pulses comprising the units digit of a code designation, the combination of operated and released ones of relays P1 through P5 registers the particular units digit. The details of the operation of the pulse counting circuit, qua pulse counting circuit, are not of the most immediate concern in the present disclosure, and reference may be had to the Williams patent for a comprehensive treatment thereof. However, the operation of auxiliary counter relay P2A is of interest here.

The tens digit 1 is not employed in the Williams system. Relay P2A has been included in the pulse counting network to guard against the registration of spurious single pulses which would otherwise be registered as a tens digit 1, and may arise, for example, from accidental momentary open circuits in the connected line (not shown) which controls line relay L (not shown). Relay P2A accomplishes this by prohibiting registration of a tens digit in another part of the register (FIG. 2, relays TD1 through TD0, herein) until it, relay P2A, operates. The operation of relay P2A also brings about the removal of the dial tone supplied by the register to a connected line (not shown). Relay P2A normally operates at the beginning of the second pulse of the first digit received by the register. When operated, relay P2A locks to the register off normal ground through the make side of its own transfer contact 6 and make contact 6 of register off normal relay ON (not shown). Relay ON (not shown) remains operated as long as the register is engaged on a particular call, and so, therefore, does relay P2A, once it has operated.

Since dial tone is not required with the present scheme of key pulse registration, and since other means (to be described later) have been introduced to guard against spurious line pulses, means have been provided to operate relay P2A as soon as the register is seized on a key pulse class of call. This means comprises transfer contact 4 of key register advance relay KRA and the source of ground potential shown in solid lines to the right of relay P2A in FIG. 3*a*. Relay KRA operates soon after the register is seized by the marker, and only on the key pulse class of calls, as will be described hereinafter. When relay KRA operates at this time, relay P2A operates from ground through the make side of contact 4 of relay KRA, and then locks to ground via the make side of its own transfer contact 6 as previously described. The break side of contact 4 of relay KRA prevents relay P3 from operating from the ground which operates relay P2A.

In the lower portion of FIG. 3 are shown the register class of service relays KPC, TLD, TTR, TLA, and COT. These relays are operated from the marker via conductors KPC0, TLD0, RTT0, TLA0, and COT0, respectively. All of the above relays, save only KPC0, are shown in FIG. 14 of the Williams patent, supra, and one of their functions is to instruct the register on how a particular call is to be handled. For example, when the marker receives a request for service from a station line in the PBX having a "toll denied" class of service, it will connect the line to the register and will operate only relay TLD; if the calling party should, in an attempt to seize a central office trunk, dial 9 as a tens digit, the register will cause the call to be intercepted by the attendant automatically. This and other aspects of the use of relays TLD, TTR, TLA, and COT are dealt with fully in the Williams patent and the operation of these relays will be described hereinafter only insofar as it is pertinent to the instant disclosure.

Key pulse class of service relay KPC has been added pursuant the instant invention and operates only on calls originating at central office and attendant trunks. On such calls, at least one each of marker relays TRC0 and TRC1, RGA and RGB, and RA0A and RA1A (none of which are shown here) will be operated when the marker connects the calling trunk to the register. All of these relays are shown, and their operation described, in the Williams patent. Since as previously mentioned, only register 0 of the Williams disclosure is being considered in detail herein, the register allotter relay associated with register 0, relay RA0A, will be assumed to operate on requests for service from central office and attendant trunks. If the register allotter relay associated with register 1 (not shown), relay RA1A (not shown), should be operated, it will be seen that provision has been made for extending ground to register 1 (not shown) via conductor KPC1 corresponding to conductor KPC0. Within the register in FIG. 3, which, it will be recalled, corresponds to register 0 of the Williams patent, relay KPC operates under the control of contacts 10 and 4 of relays SR and DC, respectively, and has a locking path to ground through its own number 12 make contact. Supervisory relay SR (not shown) is operated upon register seizure and remains operated until registration is completed and the calling line disconnected. Dial completion relay DC, shown in FIG. 2, operates after registration of the called line designation is completed. When operated from the marker via conductor KPC0, therefore, relay KPC will lock operated and remain so until digit registration is completed.

The registration portion of the register circuit is shown in FIG. 2 and the upper part of FIG. 3. The components of this registration portion which are defined by dotted lines are taken from FIG. 18 of the Williams patent, supra.

Certain elements of the register have been shown as an aid in correlating the present disclosure with that of the Williams patent, supra, but need not be considered in detail in order to understand the present invention. Relays P1, P2, P3, P4, and P5 of FIG. 3*a* will be assumed to remain unoperated hereinafter; this is true of relays TRR and OT in FIG. 2 and relay TTR in FIG. 3 as well. Contacts of relays RA, PU, TMOR, BYR, RRLA, and RRLB (these relays are shown in FIG. 18 of the Williams patent, but not reproduced herein) will be assumed to remain in their normal position (open for make contacts, closed for break contacts). Conductor UD, shown at the extreme left in FIG. 2 may be disregarded for the purposes of this description; from its upper extremity, conductor UD extends into FIG. 18 of the Williams patent. Conductor RT in FIG. 2 extends from its upper extremity into FIG. 18 of the Williams patent also. The elements enumerated above, together with their functions, are fully described in the Williams patent and will be considered hereinafter only insofar as is necessary for the purposes of the present description.

Tens digits relays TD1 through TD0 are effective to register the tens digit of a code designation received by the register. An operated one of relays TD2 through TD0 is effective to energize a corresponding one of the conductors T2–0 through T0–0, providing, in the case of relays TD8, TD9, and TD0, that relays TLD and TRR are operated. An energized one of conductors T2–0 through T0–0 is effective to transmit a registered tens digit to the marker.

In FIG. 2 herein as in FIG. 19 of the Williams patent, only a rudiment is shown of the conductor which corresponds to relay TD1 in the same way that conductor T2–0 corresponds to relay TD2; this rudiment is not extended to the marker. This is because the tens digit 1 is not employed in the Williams PBX, in accordance with the usual telephone practice of not employing an initial digit 1 where this may be avoided. As previously mentioned, relay P2A of FIG. 3*a* is employed to guard against spurious initial pulses, and in so doing prohibits the registration of the tens digit 1 in the register of the Williams PBX. Since the present invention dispenses with the need for the spurious pulse eliminating function of relay P2A on key pulse class of service calls, there is no reason why, in this case, the tens digit 1 should not be used. It will be obvious to those skilled in the art that the marker circuit of the Williams PBX may readily be adapted to accept and utilize the tens digit 1. It will thus be obvious that the omission of a conductor corresponding to relay TD1 in the same way that conductor T2–0 corresponds to relay TD2 is no limitation on the present invention.

Relays TD1 through TD0 are operable from the ten horizontal conductors extending from the left-hand side of FIG. 2 through the break sides of the respective transfer contacts 1 through 10 of steering relay STR. In the Williams patent, it is described how these conductors may be energized on dialed calls according to the combination of operated and released ones of counter relays P1, P2, P3, P4, and P5 in the pulse counting circuit (FIG. 3*a* herein). As indicated by the solid lines at the left in FIG. 2, the energizing arrangement comprising contacts of relays P1 through P5 is by-passed by conductors C1 through C0 and make contacts 1 through 10 of relay KPC on calls of the key pulse class. Tens relays TD1 through TD0 may thus be energized directly from the key pulse circuit of FIG. 1 when relay KPC is operated.

The steering, or control, mechanism in the register comprises relays SW of FIG. 3 and STR of FIG. 2, which are shown in the Williams patent, and key register advance relay KRA of FIG. 2, which has been added in accordance with the present invention. Relay KRA is operable from the key pulse circuit in FIG. 1. Relay STR is effective when operated to transfer the energizing sources for the ten horizontal conductors referred to in the preceding paragraph to the ten vertical conductors extending downward to FIG. 3 from the make sides of relay STR transfer contacts 1 through 10. In the Williams disclosure, these verticals conductors were extended directly to the marker, being continuous with the corresponding conductors U0–0 through U9–0 shown in FIG. 3 herein. In accordance with the present invention, units digits relays UD0 through UD9 and the circuits associated therewith, shown in FIG. 3, have been interposed between the vertical conductors aforesaid and the respective conductors U0–0 through U9–0. Conductors A and B, extending between FIGS. 2 and 3, supply ground and battery, respectively, to the added relays UD0 through UD9. Units digit relays UD0 through UD9 are analogous to the tens digit relays referred to above, and are effective in response to the energization of one of the ten vertical conductors thereabove to register the units digits of a code designation received by the register. An operated one of relays UD0 through UD9 is effective to energize a corresponding one of the conductors U0–0 through U9–0, which is in turn effective to transmit the registered units digit to the marker.

Having described the general functional relation of the present key pulse circuit to elements of the Williams PBX, and having particularly considered the composition of the instant key pulse and register circuits, the actual operation of the invention will now be described.

Let it be assumed that the attendant has answered an incoming call from a central office trunk and has been asked to connect the calling party to extension 40 of the Williams PBX. The attendant may then inspect the keys of the key pulse circuit to see whether key 40 is illuminated, indicating that extension 40 is busy. If key K40 is not illuminated, the attendant will operate key K40 to complete the connection as hereinafter set forth. If key K40 is illuminated, the attendant may so inform the calling party. Since the Williams PBX is provided with a camp-on feature, however, the calling trunk may still be extended to the called extension, provided that the calling party is willing to wait. If such is the case, the attendant will operate key K40.

Upon the operation of key K40, ground from ground bus GRD is connected via make contacts 1, 2, and 3, respectively, of key K40 to tens conductor TK4, units conductor UK0, and the operating circuit of relay C (see FIG. 5). Since tens relay T is not operated at this time, ground on tens conductor TK4 is extended directly to common conductor C4 over break contact 4 of relay T; this ground potential causes no register operation, however, since relay KPC is not now operated. Ground on units conductor UK0 is not extended to common conductor C0, since units relay U is not operated at this time. Contact 3 (shown in FIG. 5, but not shown in FIG. 1) of key K40 is one of the possible 100 such contacts 3 of keys K11 through K00 indicated in FIG. 1 as being disposed in parallel relation between ground bus GRD and the winding of relay C. When contact 3 of key K40 closes, an obvious circuit is completed for operating relay C, the circuit extending from ground on bus GRD, over make contact 3 (not shown) of key K40, to battery through the winding of relay C. Relay C remains operated as long as key K40 is operated.

Upon operating, relay C prepares, at its number 4 make contact, a circuit for operating relay T. Relay T does not operate at this time, however, since relay KPC is not operated. Relay C also prepares, at its number 6 make contact, a circuit for operating relay S. Relay S does not operate at this time, since relay U is not operated. Relay C completes at this time a circuit for operating cordless position hold relay HP. This circuit may be traced from ground in the box labeled ATTENDANT TRUNK CIRCUITS, over break contacts 7 of unoperated relays ACAA (not shown) of attendant trunks O0, O1, and O2, respectively make contact 8 of relay C in the box labeled CORDLESS POS. CCT., break contact 6 of auxiliary cordless position hold relay HP1, and through the winding of relay HP to battery. Upon operating, relay HP completes a circuit for operating relay HP1 which may be traced from the aforementioned ground in the box labeled ATTENDANT TRUNK CIRCUITS, over break contacts 7 of relays ACAA (not shown), make contact 8 of relay C, make contact 8 of relay HP, and through the winding of relay HP1 to battery in the key pulse circuit. Upon operating, relay HP1 renders its above-traced operating path independent of relay HP by closing, at its number 1 make contact, a link in parallel with make contact 8 of relay HP. At its number 6 break contact, relay HP1 opens the previously traced operating path for relay HP, causing the latter relay to release.

The first principal result of the operation of key K40 is thus to bring about the momentary operation of relay HP. This momentary operation of relay HP is effective to bring about the splitting of the incoming central office trunk and the assignment of a register, which has been mentioned previously. Relay HP1 remains operated until key K40 is released. The operating path of relay HP includes the break contacts of relays ACAA (not shown) so that relay HP will not operate on attendant originated calls via attendant trunks, where hold key operation, and consequent trunk splitting, etc., is not required.

Upon the momentary operation of cordless position hold relay HP, there follows the sequence of operations referred to hereinbefore which brings about marker action to interconnect the register and the inward end of the calling central office trunk. When the register is thus seized, a number of circuit operations occur therein preparatory to receiving incoming digits.

Upon the seizure of the register, line relay L (not shown) therein operates from the calling line circuit (not shown) comprising the inward end of the central office trunk. Relay L (not shown) operated causes register supervisory relay SR (not shown) to operate, which in turn operates register off normal relay ON (not shown). Relay ON (not shown) supplies off normal ground or battery to most of the register, and remains operated until the register is released. When relays ON (not shown) and SR (not shown) operate upon register seizure, the marker is able to operate various ones of the class of service relays COT, TLA, TTR, TLD, and KPC shown in FIG. 3. In the present instance, that of a central office trunk call, central office trunk class relay COT will be operated from class conductor COTO, and will lock to off normal battery over its own number 10 make contact. It will be assumed that the calling trunk has a toll allowed class of service on incoming calls to the P.B.X, meaning that it can be extended to any line terminating at the P.B.X switches, including other central office trunks. The marker will therefore operate toll allowed class relay TLA via class conductor TLA0,, and relay TLA will lock to register off normal battery through its own number 12 make contact. It will be noted that the operation of either of relays COT and TLA is effective to operate relay TLD in obvious circuits via their respective make contacts 11.

In the present instant, that of a call from a central office, relay KPC will also be operated to enable key pulse registration of a code designation. Relay KPC operates from ground in the marker, over make contact 12 of relay TRC0 or make contact 1 of relay TRC1, contact 5 of relay RGA or contact 5 of relay RGB, the make side of transfer contact 5 of relay RA0A, break contact 4 of relay DC, make contact 10 of relay SR, and through the winding of relay KPC to battery. Relay KPC, on operating, locks to ground over its own make contact 12, under the control of relays SR and DC.

At this time, only a few milliseconds after the attendant first operated key K40, class of service relays KPC, TLA, TLD, and COT are operated in FIG. 3, register relays L, SR, and ON (none of which are shown) are all operated, marker relays TRC0 or TRC1, RGA or RGB, and RA0A (none of which are shown) are operated, relays C and HP1 are operated in FIG. 1, and key K40 is still operated. After the marker has operated the above class of service relays, it will disconnect from the register, and the aforementioned marker relays will release. All of the other relays mentioned in this paragraph remain operated during the registration process described hereinafter.

Relay KPC, in operating, connects the key pulse circuit to the register and permits registration to begin. At its make contacts 1 through 10, relay KPC connects the respective common conductors C1 through C0 to the register circuit in FIG. 2. At its make contact 11, relay KPC permits key register advance relay KRA to operate in a circuit traceable from ground on bus GRD in FIG. 1, over break contact 12 of relay T, conductor KRA, make contact 11 of relay KPC, and through the winding of relay KRA to battery in FIG. 2. At its make contact 13, relay KPC permits slow operate tens relay T in FIG. 1 to begin operating in a circuit traceable from ground on bus GRD, over make contacts 13 and 4 of operated relays KPC and C, respectively, and through the winding of relay T to battery.

As soon as relay KPC operates, the tens digit of the code designation of the called extension is registered on the appropriate one of tens digit relays TD1 through TD0 in FIG. 2. In the present case, relay TD4 will be operated, and the operating circuit therefor may be traced from ground on bus GRD in FIG. 1, over make contact 1 of key K40 (see FIG. 5), tens conductor TK4, break contact 4 of relay T, common conductor C4, make contact 4 of relay KPC in FIG. 2, the break side of transfer contact 4 of unoperated steering relay STR, thence through the winding of tens digit relay TD4 to vertical conductor RT, over make contact 7 of off normal relay ON (not shown), break contact 11 of register release relay RRLB (not shown), and break contact 4 of register release relay RRLA (not shown) to battery. Relay TD4 operates in this circuit and locks itself operated through its make contact 1 to ground through the break side of transfer contact 8 of time-out relay TMOR (not shown). In operating, relay TD4 also supplies ground from the aforementioned transfer contact 8 of relay TMOR (not shown) to conductor T4–0 through contact 2 of relay TD4. When signaled at the end of registration, the marker may therefore ascertain the tens digit of the called extension's code designation from the energized condition of conductor T4–0.

At the time relay KPC operated, it brought about the operation of key register advance relay KRA. At its contacts 7 and 10, found in the lower right-hand portion of FIG. 2, relay KRA has no effect at this time. At its number 4 transfer contact in FIG. 3*a*, relay KRA causes the operation of relay P2A and prevents the operation of relay P3. Relay P2A operates from ground at the make side of transfer contact 4 of relay KRA, through its own break contact 6. Upon operating, relay P2A opens its operating path at its contact 6, and locks to off normal ground through the make side of its transfer contact 6 and make contact 6 of relay ON. At its make contact 4 in the horizontal conductor in the lower central portion of FIG. 2, relay P2A closes a link in the operating path of switching relay SW and units digit relays UD0 through UD9. Relay P2A also removes dial tone from the connected line (not shown) as previously mentioned.

At its break contact 6 in the lower left-hand corner of FIG. 2, operated relay KRA prevents ground potential being extended to the winding of relay SW in FIG. 3, or to the winding of any one of the tens digit relays TD1 through TD0 via contacts of any accidentally operated ones of the counter relays P1 through P5. The source of the latter ground potential is the previously mentioned transfer contact 8 of relay TMOR (not shown), and may be traced therefrom over break contact 3 of only tens relay OT, make contact 4 of relay P2A, and break contact 8 of unoperated register advance relay RA (not shown) to break contact 6 of relay KRA. It will be seen, therefore, that relay KRA, though operating relay P2A immediately upon register seizure, is effective to guard against the registration of spurious line opens which was previously accomplished by the delayed operation of relay P2A.

At this point in the circuit operation, the following conditions prevail: relays HP1, C, KRA, TD4, P2A, KPC, TLD, TLA and COT are operated; register relays L, SR, and ON (not shown) are operated; relay T is in the process of operating; key K40 is still operated; tens conductors TK1 through TK0 are extended to the respective tens digit relays TD1 through TD0; conductor T4–0 is energized; and tens conductor TK4 and units conductor UK0 are energized.

It will be recalled that the operation of relay KPC began the operation of slow operate relay T in FIG. 1. In the time it takes relay T to operate, the tens digit is registered as hereinbefore described. When relay T finally operates, it completes, at its make contact 1, an obvious path for energizing the winding of slow operate units relay U in FIG. 1. At its break contacts 13, 4, 7, 10 and others not shown, relay T disconnects tens conductors TK1 through TK0 from common conductors C1 through C0, respectively. At its make contact 11, relay T by-passes make contact 4 of relay C in its own operating path. The latter provision is to permit registration to proceed in spite of the fact that the attendant may accidentally jiggle key K40, causing relay C to release momentarily. In addition to the foregoing operations, relay T functions, at its break contact 12, to release relay KRA by opening the operating path of the latter relay.

When relay KRA is thus released, only the closure of its break contact 6 brings about any substantial circuit changes. In closing its break contact 6, relay KRA causes switching relay SW to operate in a circuit which may be traced from ground, over the break side of transfer contact 8 of relay TMOR (not shown), break contact 3 of relay OT, make contact 4 of relay P2A, break contact 8 of relay RA (not shown), break contact 6 of relay KRA, break contact 10 of relay DC, and through the winding of relay SW to battery. Relay SW, in operating, releases any of the counter relays P1 through P5 of FIG. 3*a* which may have operated due to momentary open circuits in the connected line (not shown) and completes a circuit for operating relay STR of FIG. 2, the latter circuit extending from battery, through the winding of relay STR, and thence to ground through make contacts 10 and 9 of respective relays SW and ON. In operating, relay STR, at its transfer contacts 1 through 10, transfers the register input (on the left in FIG. 2) from the tens digit relays TD1 through TD0 of FIG. 2 to the corresponding units digit relays UD1 through UD0 shown in FIG. 3. Relay STR also completes a locking circuit for itself from the right-hand side of its winding over its own make contact 11, to ground over make contact 9 of relay ON (not shown). The common conductors C1 through C0 are thus extended to the units digit relays UD1 through UD0 numerically correspondent thereto via the respective operated contacts of relays KPC and STR.

At this point in the circuit operation, the following conditions prevail: relays HP1, C, T, TD4, SW, STR, P2A, KPC, TLD, TLA, and COT are operated; register relays L, SR, and ON (not shown) are operated; relay U is in the process of operating; key K40 is still operated; common conductors C1 through C0 are extended to the respective units digit relays UD1 through UD0; none of units conductors UK1 through UK0 or tens conductors TK1 through TK0 are connected to common conductors C1 through C0; conductor T4–0 is energized; and tens and units conductors TK4 and UK0 are energized.

It will be recalled that the operation of relay T in FIG. 1 began the operation of slow operate units relay U. In the time it takes relay U to operate, steering relay STR in FIG. 2 operates as described above. When relay U finally operates, it completes the operating circuit for slow operate relay S, which circuit extends from ground on bus GRD, over make contacts 12 and 6 of operated relays U and C, respectively, and through the winding of relay S to battery. Relay S begins to operate in this circuit. At its make contact 11, relay U re-establishes the operating circuit for relay KRA in FIG. 2; this circuit may be traced from ground on bus GRD, over make contact 11 of relay U, break contact 7 of relay S, conductor KRA, make contact 11 of relay KPC, and through the winding of relay KRA to battery. It will be noted that this operating circuit is under the control of relay S which will remain unoperated for a short time. Upon operating, relay KRA operates relay UD in FIG. 2 in a circuit which can be traced from ground at make contact 9 of relay ON (not shown), over make contact 11 of operated relay STR, make contact 10 of relay KRA, break contact 4 of relay TMOR (not shown), and through the winding of relay UD to battery. Relay UD operates in this circuit, and, at its make contact 4, completes a link in the operating path for dial completion relay DC in FIG. 2. Relay DC does not operate at this time, however, since its operating path is still open at break contact 7 of operated relay KRA. Relay UD also completes a locking circuit for itself which may be traced from the left-hand side of its winding, over contact 4 of relay TMOR (not shown), contact 2 of relay UD, and contact 9 of relay ON (not shown) to ground. In operating, relay KRA also effects the release of relay SW by opening, at KRA break contact 6, the previously traced operating path for relay SW. This release of relay SW is of no particular significance in the present disclosure.

In addition to operating relay KRA and beginning the operation of relay S, relay U is operative to connect the units conductors UK1 through UKO (only conductors 1, 4, 7, and 0 of which are shown) to the respective common conductors C1 through C0 via its respective make contacts 1 through 10 (only contacts 1, 4, 7, and 10 are shown). It will be recalled that the operation of key K40 connected units conductor UK0 to bus GRD at its contact 2 (see FIG. 5). Upon the operation of relay U, therefore, a circuit is completed for operating units digit relay UDO which may be traced from ground on bus GRD, over make contact 2 of key K40 to conductor UK0, over make contact 10 of relay U, common conductor C0, make contact 10 of relay KPC in FIG. 2, the make side of transfer contact 10 of steering relay STR, through the winding of units digit relay UD0 in FIG. 3, over conductor B, over make contact 7 of relay ON (not shown) in FIG. 2 and break contacts 11 and 4 of relays RRLB (not shown) and RRLA (not shown), respectively, to battery. Relay UD0 operates in this circuit and locks to ground in a circuit which may be traced from the right-hand side of relay UD0, through make contact 1 of relay UD0, over common ground conductor A to FIG. 2, over break contact 8 of relay RA (not shown), make contact 4 of relay P2A, break contact 3 of relay OT, and thence to ground through the break side of transfer contact 8 of unoperated relay TMOR (not shown). Relay UD0 also extends ground from common ground conductor A via its make contact 2 to conductor U0–0 in FIG. 3. The latter conductor terminates in the marker and the marker is thereby informed of the units digit of the designation of the called extension.

At this point in the circuit operation, the following conditions prevail: relays HP1, C, U, T, KRA, TD4, STR, UD, UD0, P2A, KPC, TLD, TLA, and COT are operated; register relays L, SR, and ON (not shown) are operated; relay S is in the process of operating; key K40 is still operated; units conductors UK1 through UKO extend to the respective units digit relays UD1 through UD0; conductors T4–0 and U0–0 are energized; and tens and units conductors TK4 and UK0 are energized.

After units relay U in FIG. 1 has operated, and sufficient time for the above-described units registration to take place has elapsed, slow operate relay S in FIG. 1 will operate. The sole function of relay S is to bring about the release of relay KRA, which it does (see FIG. 1) by opening the previously traced operating circuit of the latter relay at break contact 7 of relay S. Upon releasing, relay KRA completes an operating circuit for dial completion relay DC in FIG. 2 which circuit may be traced from battery, over break contacts 4 and 11 of respective relays RRLA (not shown) and RRLB (not shown), make contact 7 of relay ON (not shown), through the winding of relay DC, break contact 6 of relay RA (not shown), break contact 7 of relay KRA, make contact 4 of relay UD, and break contact 8 of relay BYR (not shown) to ground. Relay DC, in operating, completes a locking circuit for itself in an obvious fashion over it own make contact 1. At its break contact 4, relay DC opens the previously traced operating path for relay KPC, causing the latter relay to release. The release of relay KPC opens the operating circuit for relay T in FIG. 1, causing relay T to release; the release of relay T brings about the release of relay U, which in turn releases relay S. All of the register control relays in FIG. 1 are therefore released at this time. Relay C remains operated directly from still operated key K40. At its make contacts 1 through 11, the released relay KPC severs all connections between the key pulse circuit of FIG. 1 and the register of FIG. 2.

The operation of relay DC serves to notify the marker (via circuits not here shown; see FIG. 14 of the Williams patent, supra) that the called line designation has been registered, and to recall the marker to complete the necessary connections between the calling central office trunk and the now-identified called line. The marker will then inspect conductors T2–0 through T0–0 and conductors U0–0 and U9–0 and, upon finding conductors T4–0 and U0–0 grounded will extend the calling trunk to line 40. The marker will also, by disconnecting the inward end of the calling trunk from the register, cause the register to restore to normal, releasing the operated relays therein. When the attendant determines through means not shown here, that the called line is being rung, or that the calling trunk has been camped-on the called line, or that the called line is already camped-on, or learns in any other way, including the illumination of lamp LA40 in response to the operation of line hold magnet LHM40 if the called party answers, that the marker has responded to the registration of the called line designation 40, she will release key K40. The release of key K40 causes the release of relay C which in turn releases relay HP1. The entire key pulse circuit is thus returned to normal upon the release of key K40, with the possible exception that some lamps, such as lamp LA40, may remain illuminated.

It is to be understood that the described arrangement is merely illustrative of the application of the principles of the invention. Numerous other arrangements may be devised by those skilled in the art wthout departing from the spirit and scope of the invention.

What is claimed is:

1. In combination, a selection circuit having a plurality of output portions, means in said circuit operable to condition said plurality of portions according to a plurality of data, a register having a plurality of sections, connecting means intermediate said register and said circuit, means in said register operable to selectively terminate said connecting means in different ones of said plurality of sections, a control channel intermediate said terminating means and said circuit, and registration control means in said circuit operable to selectively connect said output portions to said connecting means in timed sequence and to operate said terminating means via said control channel in synchronism with said sequence of selective connections, whereby said plurality of data are registered in said plurality of sections.

2. In combination, a selection circuit having a plurality of output portions, means in said circuit operable to concurrently condition said plurality of portions according to a plurality of data, a register having a plurality of sections respectively corresponding to said plurality of portions, connecting means intermediate said register and said circuit, means in said register operable to selectively terminate said connecting means in successive ones of said plurality of sections, a control channel intermediate said terminating means and said circuit, and registration control means in said circuit operable to selectively connect successive ones of said portions to said connecting means in timed sequence and to operate said terminating means via said control channel in synchronism with said sequence of selective connections, whereby said plurality of data are registered in said plurality of sections respectively.

3. The invention claimed in claim 2 wherein each of said portions comprises a plurality of signal conductors, wherein said connecting means comprises a plurality of connector conductors individually connectable to corresponding ones of said signal conductors, wherein each of said connector conductors is individually connected to a corresponding one of said signal conductors when said connecting means is connected to one of said portions, wherein each of said sections comprises a plurality of register relays individually operable from corresponding ones of said connector conductors, wherein said conditioning means is operable to energize at least one of said signal conductors in each of said plurality of portions, and wherein said registration control means is operable under the control of the operation of said conditioning means.

4. The invention claimed in claim 2 wherein said registration control means comprises timing means, wherein said terminating means comprises steering means and register advance means, wherein said steering means is operable under the control of said advance means to selectively terminate said connecting means, wherein said advance means is operable under the control of said timing means via said control channel, and wherein said portions are selectively connectable to said connecting means under the control of said timing means.

5. The invention claimed in claim 3 wherein said registration control means comprises timing means, wherein said terminating means comprises steering means and register advance means, wherein said steering means is operable under the control of said advance means to selectively terminate said connecting means, wherein said advance means is operable under the control of said timing means via said control channel, and wherein said portions are selectively connectable to said connecting means under the control of said timing means.

6. The invention claimed in claim 4 wherein said timing means comprises slow-acting relay means.

7. The invention claimed in claim 6 wherein said slow-acting relay means comprises a plurality of slow-operate relays operable in tandem.

8. The invention claimed in claim 5 wherein said timing means comprises slow-acting relay means.

9. The invention claimed in claim 8 wherein said slow-acting relay means comprises a plurality of slow-operate relays operable in tandem.

10. In a telephone system, a selection circuit having a first and a second group of signal conductors, means in said circuit operable to condition said first and second groups according to a first and a second datum respectively, a register having a first and a second section, a group of connector conductors intermediate said register and said circuit, means in said register operable to alternatively terminate said group of connector conductors in either of said sections, a control conductor intermediate said terminating means and said circuit, and registration control means in said circuit operable to selectively connect said groups of signal conductors to said group of connector conductors in timed sequence and to operate said terminating means via said control conductor in synchronism with said sequence of selective conections, whereby said first and second data are registered in said first and second sections respectively.

11. The invention claimed in claim 10 wherein said registration control means comprises a plurality of slow-acting relays operable in tandem, wherein said terminating means comprises an advance relay operable under the control of said slow-acting relays, wherein said group of connector conductors is normally terminable in said first section, and wherein said first group of signal conductors is normally connected to said group of connector conductors.

12. The invention claimed in claim 11 wherein starting means is provided in said register, wherein said latter means is operative to connect said group of connector conductors and said control conductor to said register, wherein concurrent operation of said conditioning means and said starting means is effective to operate said registration control means, wherein said register comprises completion means operable to release said starting means, and wherein said completion means is operable under the control of said registration control means.

13. In a telephone system, a selection circuit having a first and a second group of signal conductors, means for electrically conditioning said groups concurrently according to a first and a second datum respectively, a register having a first and a second section, connector means for extending said groups to said register, steering means in said register for normally terminating said connector means in said first section and actuable to transfer said connector means to said second section, advance means in said register controllable to actuate said steering means, control means in said circuit, a control channel for interconnecting said advance means and said control means, means for applying a start signal to said control means, first circuit means in said control means normally connecting said first group to said connector means and responsive to said start signal to disconnect said first group from said connector means after a first time interval, second circuit means in said control means controlled by said first circuit means and effective at the end of said first time interval to connect said second group to said connector means fater a second time interval, and means including said first and second circuit means and said control channel for controlling said advance means, whereby said sections and said groups are selectively interconnectable in timed sequence to register said first and second data in said first and second sections respectively.

14. The invention claimed in claim 13 wherein said register comprises starting means and completion means, wherein said applying means comprises said conditioning means and said starting means, wherein said starting means is operative to connect said connector means and said control channel to said register, wherein is provided third circuit means in said control means controlled by said second circuit means and effective at the end of said second time interval to control said advance means at the end of a third time interval, and wherein said completion means is operative under the control of said advance means to render said starting means inoperative at the end of said third time interval.

15. In a telephone system, a register; a first and a second section in said register; a plurality of register relays in each of said sections, the register relays of each of said pluralities being selectively operable to register a digit; a plurality of connector conductors connectable to said register and alternatively terminable in said first and second sections, each of said conductors being individually terminable at a corresponding one of said register relays and being energizable to operate the register relay corresponding thereto; an energizable control conductor connectable to said register; first relay means in said register operable to connect said connector conductors and said control conductor to said register; second relay means in said register for normally terminating said connector conductors in said first section and operable to terminate said connector conductors in said second section; third relay means in said register operable in response to the energization of said control conductor; a keyset at which said connector conductors and said control conductor terminate; a first and a second plurality of signal conductors in said keyset alternately connectable to said plurality of connector conductors, each of said signal conductors being individually connectable to a corresponding one of said connector conductors and being energizable to energize a connected connector conductor corresponding thereto; a plurality of keys in said keyset individually operable to selectively energize signal conductors of said first and second pluralities according to a first and a second digit respectively; and a control circuit in said keyset operable in response to concurrent operation of said first relay means and any one of said keys to alternately connect said pluralities of signal conductors to said connector conductors and to energize and de-energize said control conductor at timed intervals; whereby said first and second digits are registered in said first and second sections respectively.

16. The invention claimed in claim 15 wherein said control circuit comprises first circuit means normally connecting said first plurality of signal conductors to said connector conductors and normally energizing said control conductor, wherein said first circuit means is energized upon concurrent operation of said first relay means and any one of said keys and is operative after a first time interval to disconnect said first plurality of signal conductors from said connector conductors and to de-energize said control conductor, wherein the de-energization of said control conductor after said first time interval causes said third relay means to release, wherein the release of said third relay means after said first time interval causes said second relay means to operate, and wherein said control circuit comprises second circuit means energized incident to the operation of said first circuit means and operative after a second time interval to connect said second plurality of signal conductors to said connector conductors and to energize said control conductor.

17. The invention claimed in claim 16 wherein said register comprises fourth relay means operable to release said first relay means, wherein said control circuit comprises third circuit means energized incident to the operation of said second circuit means and operative after a third time interval to de-energize said control conductor, wherein the de-energization of said control conductor after said third time interval causes said third relay means to release, and wherein the release of said third relay means after said third time interval causes said fourth relay means to operate.

18. The invention claimed in claim 17 wherein each of said circuit means comprises a slow-acting relay.

19. The invention claimed in claim 18 wherein each said slow-acting relay is a slow-operate relay.

References Cited in the file of this patent

UNITED STATES PATENTS

| | | |
|---|---|---|
| 2,283,395 | Strickler | May 19, 1942 |
| 2,697,749 | Jeanne et al. | Dec. 21, 1954 |